(12) United States Patent
Faynberg et al.

(10) Patent No.: US 8,973,125 B2
(45) Date of Patent: Mar. 3, 2015

(54) APPLICATION LAYER AUTHENTICATION IN PACKET NETWORKS

(75) Inventors: Igor Faynberg, East Brunswick, NJ (US); Hui-Lan Lu, Marlboro, NJ (US)

(73) Assignee: Alcatel Lucent, Boulogne-Billancourt (FR)

( * ) Notice: Subject to any disclaimer, the term of this patent is extended or adjusted under 35 U.S.C. 154(b) by 262 days.

(21) Appl. No.: 12/790,143

(22) Filed: May 28, 2010

(65) Prior Publication Data

US 2011/0296518 A1    Dec. 1, 2011

(51) Int. Cl.
G06F 15/16 (2006.01)
H04L 29/06 (2006.01)
H04W 12/06 (2009.01)
H04W 88/16 (2009.01)

(52) U.S. Cl.
CPC ........... *H04L 63/0815* (2013.01); *H04W 12/06* (2013.01); *H04L 63/0853* (2013.01); *H04L 63/102* (2013.01); *H04W 88/16* (2013.01)
USPC ............................................. 726/13; 713/185

(58) Field of Classification Search
CPC ............ H04L 63/0815; H04L 63/0853; H04L 63/102; H04L 63/0263; H04W 12/06; H04W 88/16; G06F 21/34; G06F 21/31
USPC ............................................. 726/13; 713/185
See application file for complete search history.

(56) References Cited

U.S. PATENT DOCUMENTS

2004/0193712 A1*  9/2004  Benenati et al. .............. 709/225
2006/0080542 A1   4/2006  Takeuchi et al.
2007/0022469 A1*  1/2007  Cooper et al. ..................... 726/3
2007/0204168 A1*  8/2007  Cameron et al. .............. 713/185
2008/0075073 A1*  3/2008  Swartz ........................... 370/389

(Continued)

FOREIGN PATENT DOCUMENTS

JP    2006113624 A    4/2006
JP    2006514476 A    4/2006

(Continued)

OTHER PUBLICATIONS

Ntantogian et al., One-Pass EAP-AKA Authentication in 3G-WLAN Integrated Networks, Jul. 1, 2008, Springer Science+Business Media, llc pp. 570-584.*

(Continued)

*Primary Examiner* — Harunur Rashid
(74) *Attorney, Agent, or Firm* — Ryan, Mason & Lewis, LLP

(57) ABSTRACT

In a communication network, assume a first computing device is an end user device, a second computing device is a gateway server, and a third computing device is an application server. A method comprises the following steps. The second computing device authenticates one or more packets received from the first computing device. The second computing device marks the one or more packets with a first-layer identity before routing the one or more packets toward the third computing device such that the third computing device is able to authenticate the one or more packets from the first computing device by confirming an association between the first-layer identity and a second-layer identity. For example, the first-layer identity may comprise a link layer identity assigned to the first computing device and the second-layer identity may comprise an application layer identity assigned to the first computing device.

17 Claims, 10 Drawing Sheets

(56) References Cited

U.S. PATENT DOCUMENTS

| | | | |
|---|---|---|---|
| 2008/0127320 A1* | 5/2008 | De Lutiis et al. | 726/9 |
| 2010/0132031 A1* | 5/2010 | Zheng | 726/13 |
| 2010/0208742 A1* | 8/2010 | Kafle et al. | 370/401 |
| 2010/0262703 A1 | 10/2010 | Faynberg et al. | |
| 2011/0002465 A1* | 1/2011 | Ahn et al. | 380/272 |
| 2011/0010764 A1* | 1/2011 | Lei et al. | 726/7 |
| 2011/0271110 A1* | 11/2011 | Ohba et al. | 713/168 |

FOREIGN PATENT DOCUMENTS

| | | | |
|---|---|---|---|
| JP | 2008518533 A | | 5/2008 |
| JP | 2008521076 A | | 6/2008 |
| WO | 2004077739 A1 | | 9/2004 |
| WO | 2006053117 A2 | | 5/2006 |
| WO | WO2006045402 A1 | | 5/2006 |
| WO | WO2009103188 A1 | | 8/2009 |
| WO | WO2010000298 A1 | | 1/2010 |
| WO | WO2010000298 A1 | * | 1/2010 |
| WO | 2011036727 | | 9/2011 |

OTHER PUBLICATIONS

Gouda et al., Enhanced Authentication Mechanism for Next Generation Networks, 2009 First International Conference on Computational Intelligence, Communication Systems and Networks, Print ISBN: 978-0-7695-3743-6, pp. 288-295.*

C. Ntantogian et al., "Efficient Authentication for Users Autonomy in Next Generation All-IP Networks," Bio-Inspired Models of Network, Information and Computing Systems, IEEE, 2007, 6 pages.

Digital Cellular Telecommunications System (Phase 2+); Universal Mobile Telecommunications System (UMTS); ETSI TR 133 924, V9.1.0, 2010, 30 pages.

A. Niemi et al., "Hypertext Transfer Protocol (HTTP) Digest Authentication Using Authentication and Key Agreement (AKA)," Network Working Group RFC 3310, Sep. 2002, 20 pages.

V. Torvinen et al., "Hypertext Transfer Protocol (HTTP) Digest Authentication Using Authentication and Key Agreement (AKA) Version-2," Network Working Group, RFC 4169, Nov. 2005, 15 pages.

OpenID Authentication 2.0, specs@openid.net; Dec. 5, 2007, 36 pages.

Identity Management (IdM) Standard for IP-based Next Generation Networks (NGN) as specified in International Telecommunication Union—Telecommunication Standardization Sector (ITU-T) Recommendation Y.2720 entitled NGN Identity Management Framework, Jan. 2009, 34 pages.

D. Recordon et al., "OpenID Provider Authentication Policy Extension 1.0," Dec. 30, 2008, 11 pages.

ITU-T standards document referred to as ITU-T New Draft Recommendation: "Requirements for DPI in packet-based networks and NGN," draft 2010, ITU-T, Apr. 19-30, 2010, 57 pages, Geneva. Switzerland.

3GPP GBA: 3GPP TS 33.220 V.2.0 (Dec. 2009), 3rd Generation Partnership Project; Technical Specification Group Services and System Aspects; Generic Authentication Architecture (GAA); Generic bootstrapping architecture (Release 9), Sep. 2012, 75 pages.

* cited by examiner

300

400

500

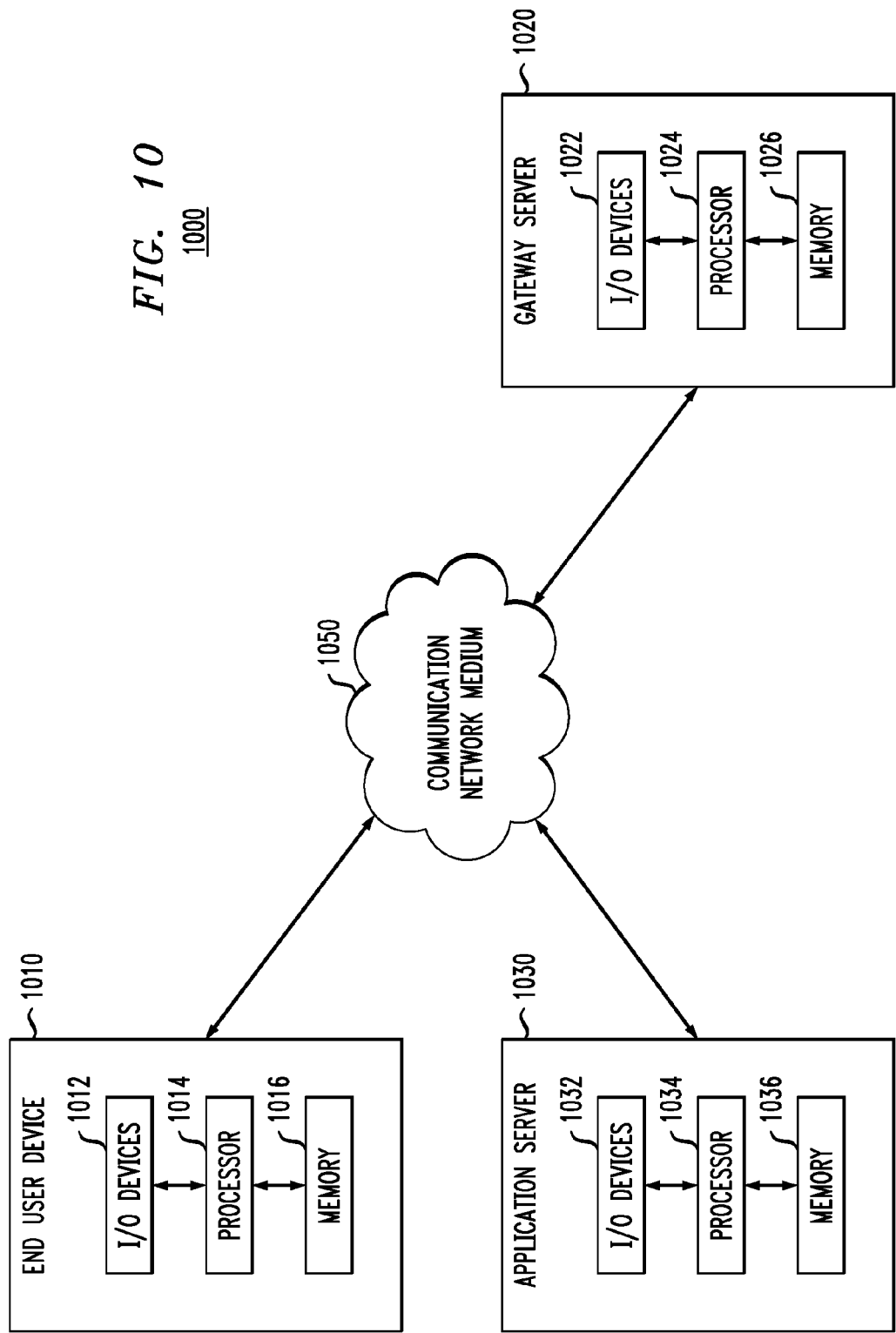

APPLICATION LAYER AUTHENTICATION IN PACKET NETWORKS

FIELD OF THE INVENTION

The present invention relates generally to communication networks, and more particularly to authentication techniques in communication networks.

BACKGROUND

This section introduces aspects that may help facilitate a better understanding of the inventions. Accordingly, the statements of this section are to be read in this light and are not to be understood as admissions about what is prior art or what is not prior art.

Generally, in existing authentication approaches, user devices (end users) seeking access to an application over a particular communication network must first be authenticated by the communication network itself and then, second, they must be authenticated again (re-authenticated) by an application server that is serving the application sought to be accessed by the end user.

The Generic Bootstrapping Architecture (GBA) is one technology enabling the authentication of an end-user. GBA is standardized by the $3^{rd}$ Generation Partnership Project (3GPP) in accordance with 3GPP Technical Specification (TS) 33.220, the disclosure of which is incorporated by reference herein in its entirety. In general, GBA authenticates by making an initial network component challenge the end user device when attempting to gain access to the network and verify that the challenge response is similar to one predicted by a Home Location Register (HLR) or a Home Subscriber Server (HSS).

However, GBA also requires explicit re-authentication of the end user at the application layer. This re-authentication is performed in accordance with the 3GPP Authentication and Key Agreement (AKA) protocol, see RFC 3310: "Hypertext Transfer Protocol (HTTP) Digest Authentication Using Authentication and Key Agreement (AKA)," September 2002, the disclosure of which is incorporated by reference herein in its entirety; and RFC 4169: "Hypertext Transfer Protocol (HTTP) Digest Authentication Using Authentication and Key Agreement (AKA) Version-2," November 2005, the disclosure of which is incorporated by reference herein in its entirety.

Such a re-authentication causes several problems such as, for example, the need for extra accesses to HLR/HSS databases and the need for re-synchronization caused by potential problems with the AKA sequence number (SQN) parameter. Furthermore, GBA uses the AKA Digest protocol, which is not supported by standard Web browsers.

Accordingly, improved end user authentication techniques are needed.

SUMMARY

Embodiments of the invention provide techniques for efficient authentication of an end user device at an application server of a communication network.

In a first aspect, wherein it is assumed that, in a communication network, a first computing device is an end user device, a second computing device is a gateway server, and a third computing device is an application server, a method comprises the following steps.

The second computing device authenticates one or more packets received from the first computing device. The second computing device marks the one or more packets with a first-layer identity before routing the one or more packets toward the third computing device such that the third computing device is able to authenticate the one or more packets from the first computing device by confirming an association between the first-layer identity and a second-layer identity.

In a second aspect, wherein it is again assumed that, in a communication network, a first computing device is an end user device, a second computing device is a gateway server, and a third computing device is an application server, a method comprises the following steps.

The third computing device receives one or more packets from the second computing device, the second computing device having authenticated the one or more packets received from the first computing device and having marked the one or more packets with a first-layer identity before routing the one or more packets toward the third computing device. The third computing device authenticates the one or more packets from the first computing device by confirming an association between the first-layer identity and a second-layer identity.

In one embodiment, the first-layer identity comprises a link layer identity assigned to the first computing device (e.g., assigned by the gateway server or some other server), and the second-layer identity comprises an application layer identity assigned to the first computing device (e.g., previously assigned by the application server or some other server).

Further aspects are provided in accordance with apparatus comprising a memory and a processor coupled to the memory and operative to perform steps of the above-described respective methods.

Still further aspects are provided in accordance an article of manufacture comprising a non-transitory processor-readable storage medium storing one or more software programs which when executed by a processor associated with a computing device perform the steps of the above-described respective methods.

Advantageously, illustrative embodiments of the invention provide for eliminating a repetition of authentication for the end user. Instead, illustrative principles of the invention build on the fact that each packet enters the network through a gateway, which has already authenticated that packet at the link layer. Thus, the end user can be authenticated at the application layer level simply by the application server confirming that an association (e.g., match) exists between the link layer identity of the end user (which is determined from the marked or labeled packets, referred to herein as "packet painting") and an application layer identity of the end user, rather than performing another complete AKA authentication procedure.

These and other features and advantages of the present invention will become more apparent from the accompanying drawings and the following detailed description.

BRIEF DESCRIPTION OF THE DRAWINGS

FIG. 10 is a diagram of a hardware architecture of a communication network suitable for implementing packet painting, according to an embodiment of the invention.

DETAILED DESCRIPTION OF THE INVENTION

Figure 1:
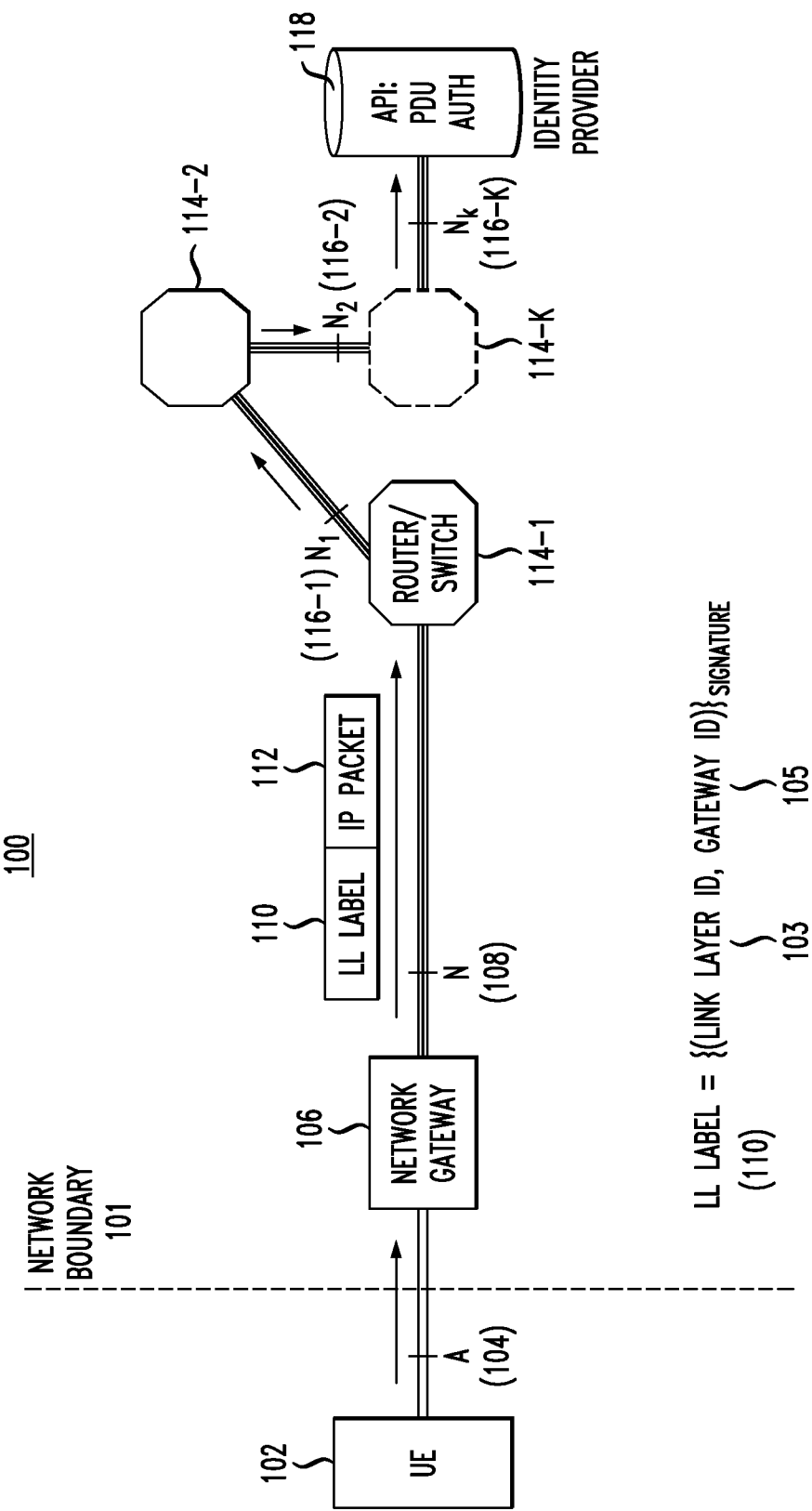
FIG. 1 is a diagram of a portion of a communication network within which packet painting can be performed, according to a first embodiment of the invention.

Illustrative embodiments of the invention provide for authentication of an end user device (end user) over an application layer of a packet network based on a link layer authentication performed at a network gateway. Thus, there is no need for an explicit re-authentication of the end user at any application server inside the packet network, i.e., no AKA authentication procedure needs to be performed at the application layer level. The inventive authentication is achieved by using a packet marking, labeling or augmenting technique referred to illustratively herein as "packet painting."

As used herein, the phrase "end user device" (or "user equipment") is generally defined to be a device with which a human interacts in order to access the network and its services. Such a device can be, by way of example only, a mobile phone, a personal computer, or an Internet appliance. Such a device should also preferably have the means to interact, possibly through yet another device, with a smart card (such as Subscriber Identity Module or SIM card) that maintains security credentials (e.g., AKA credentials).

As used herein, the team "gateway" or "network gateway" is generally defined to be a computing networking device that belongs to a specific provider's network but is also connected to one or more other networks such as, for example, another provider's network or the Internet. With that, the connection to an outside network can be at a physical level (as embodied by a wireless base station) or at an application level as in the case of an HTTP or SIP (Session Initiation Protocol) proxy or an HTTP or SIP server.

As used herein, the phrase "application server" is generally defined to be a computing networking device that performs the server role in client/server application protocols such as, by way of example only, HTTP or SIP.

It is to be appreciated that while the illustrative embodiments described herein are directed to the application layer and the link layer, principles of the invention are not limited thereto. That is, authentication of an end user can be efficiently performed over one network framework layer of a communication network based on an authentication previously performed over another network framework layer. Thus, the application layer and link layer are merely examples of network framework layers with which principles of the invention may be implemented. Such principles may apply to other layers of the seven layer (application, presentation, session, transport, network, link, and physical) Open System Interconnection (OSI) model or other appropriate network framework models.

Advantages that are realized through use of illustrative packet painting techniques of the invention include, but are not limited to: (1) reducing load on the HLR/HSS; (2) streamlining (simpler and faster) authentication; and (3) full interworking with existing browsers (by removing the requirement for AKA support). As a result of packet painting, simplified bootstrapping to third-party applications is provided. Another result is the provision of a simplified authentication mechanism for supporting OpenID.

OpenID is an open, decentralized, free framework for user-centric digital identity. That is, OpenID allows users to log onto many services with the same digital identity. OpenID is managed by the OpenID Foundation (San Ramon, Calif.). The standard is described in detail in OpenID Authentication 2.0 and OpenID Provider Authentication Policy Extension 1.0, the disclosures of which are incorporated by reference herein in their entirety.

In accordance with illustrative principles of the invention, any application server within the network can authenticate an application layer protocol data unit (PDU) as long as it is ensured that all parts of this PDU have arrived into the network over a set of already authenticated lower-layer PDUs (such as link-layer frames). This is achieved with the inventive packet painting technique. In one embodiment, a gateway node (such as, e.g., a mobile base station, Node B, Packet Data Gateway, Broadband Network Gateway, or Next Generation Network (NGN) Access Node), which authenticates the user at the link layer, issues a (possibly signed) label, confirming the link-layer identity of the user. Such a label can, by way of example, be: (1) inserted before the Internet Protocol (IP) packet, with the insertion propagated across the network; and/or (2) carried in an existing or new IP header. Once the painted PDU reaches the application server, the application server only needs to ascertain the association between the link-layer identity and an application-layer identity (e.g., via a lookup table comparison), rather than requiring the end user to perform another authentication procedure (such as AKA protocol or procedure) with the application server. This illustrative solution also preferably provides for routers (or multi-protocol switches) to pass the label with every packet in the stream. Another advantage is that the packet painting technique requires no application-layer protocol changes.

In another embodiment, deep packet inspection (DPI) is employed at the gateway and a PDU is painted (e.g., augment, marked or labeled with the link-layer identity) conditionally or upon certain triggers. One example of such a trigger is when the gateway recognizes that an OpenID request via HyperText Transport Protocol (HTTP) redirection has taken place.

Another example of a trigger or condition is when the gateway recognizes that the destination address corresponds to an identity provider (IdP). An IdP is effectively a gateway entity to the operator network within its boundary in accordance with an Identity Management (IdM) Standard for IP-based Next Generation Networks (NGN) as specified in International Telecommunication Union—Telecommunication Standardization Sector (ITU-T) Recommendation Y.2720 entitled "NGN Identity Management Framework," the disclosure of which is incorporated by reference herein in its entirety. An NGN or Next Generation Network is a packet-based network able to provide services including telecommunication services and able to make use of multiple broadband, quality-of-service (QoS)-enabled transport technologies and in which service-related functions are independent from underlying transport-related technologies. It is realized that the Identity Management (IdM) concept can enable new services by operators of communications networks, e.g., telecom operators or network operators (note that these two phrases may be used interchangeably herein). Examples of such operators may include but are not limited to AT&T, Verizon, NTT, China Mobile, France Telecom/Orange.

Examples of NGN technologies include but are not limited to the Universal Mobile Telecommunications System (UMTS), IP Multimedia Subsystem (IMS), or the like. These networks are managed by a network operator. In the IdM framework, the identity provider entity is controlled and operated by the network operator.

In both illustrative embodiments mentioned above, i.e., either automatic packet painting or conditional/triggered packet painting, illustrative principles of the invention exploit the fact that since all packets typically have to pass through a network gateway server and such gateway server has to authenticate the end user, this authentication can be recursively extended to the application layer.

One illustrative application of the inventive principles is development of Web 2.0 application enablers, such as OpenID or OAuth, by NGN providers. In the OAuth context, it is realized that various facilities available via communication networks, such as the World Wide Web, permit users to create their own applications or web pages. One example is known as a "mashup," which is a web page or application that uses or combines data or functionality from two or many more sources to create a new service or application. A problem arises, however, when the user is required to give his/her credentials (username and password) for one source to another source, thus exposing information between sources and giving one source full access to the other source. This may not be desirable to the user. A protocol known as OAuth attempts to provide a solution to this problem. In general, the OAuth protocol (see http://oauth.net/) enables users to provide third-party access to their web resources without sharing their passwords. Packet painting according to the invention may be implemented in the OAuth context.

While illustrative embodiments of the invention may be employed with OpenID or OAuth protocols, it is to be understood that principles of the invention are not limited to these protocols but rather any application server is able to authenticate the user via the inventive packet painting process independent of the application-specific protocol used.

FIG. 1 is a diagram of a portion of a communication network 100 within which packet painting can be performed, according to a first embodiment of the invention. As shown in this embodiment, the end user device 102 (or user equipment UE which may be, but is not limited to, such Internet appliances as a personal computer or a mobile phone) has established an authenticated link-layer connection with the network gateway server 106 (such as, for example, an NGN access node) over the access interface A 104. Examples of access interfaces may include, but are not limited to, wireless Long Term Evolution (LTE), Digital Subscriber Line (DSL), or Local Area Network (LAN). Note that the network boundary is denoted as 101. The network gateway server 106 authenticates the UE 102, using the AKA protocol, based on its link layer identifier or identity (Id) 103 (such as, for example, an International Mobile Subscriber ID (IMSI)). All the messages between the network gateway server 106 and the identity provider server (IdP) 118 trace a series of network routers (or multi-protocol switches) 114-1, 114-2 . . . 114-$k$). Note that the identity provider 118 is an example of an application server.

In accordance with this illustrative embodiment of the invention, the network gateway server 106 then inserts a label 110 before every IP packet 112 that it sends to the router or a switch 114-1 on an interface N 108, i.e., it appends a label to each packet. Examples of such an interface N may include, but are not limited to, the 802.2 family of link layer protocols, High-Level Data Link Control (HDLC), or Point-to-Point Protocol (PPP). Subsequently, each router or switch in the path (114-1, 114-2 . . . 114-$k$) copies the same label 110 along the way, over the interfaces $N_1$, $N_2$, and $N_k$. (116-1, 116-2 . . . 116-$k$).

Finally, at the identity provider server 118, only the painted (labeled) packets are accepted, and thus it is possible (via, for example, an application programming interface or API (not shown)) to authenticate the application layer PDUs and trace each of them to a particular LLID 103, which is, in turn associated with an appropriate application layer identifier or identity (such as an OpenID or IMSI). Note that the gateway ID 105 in the LL Label 110 is provided in a preferred embodiment.

Note that the label 110 can be signed. The "signature" as used herein, given that this is a trusted network, is not necessarily a cryptographic one, although it could be. In the simplest case, the signature can be null.

The above embodiment concerns only the case where the end user is not roaming (in a sense of traversing another provider's network). Roaming introduces a complication, which is considered below.

Figure 2:
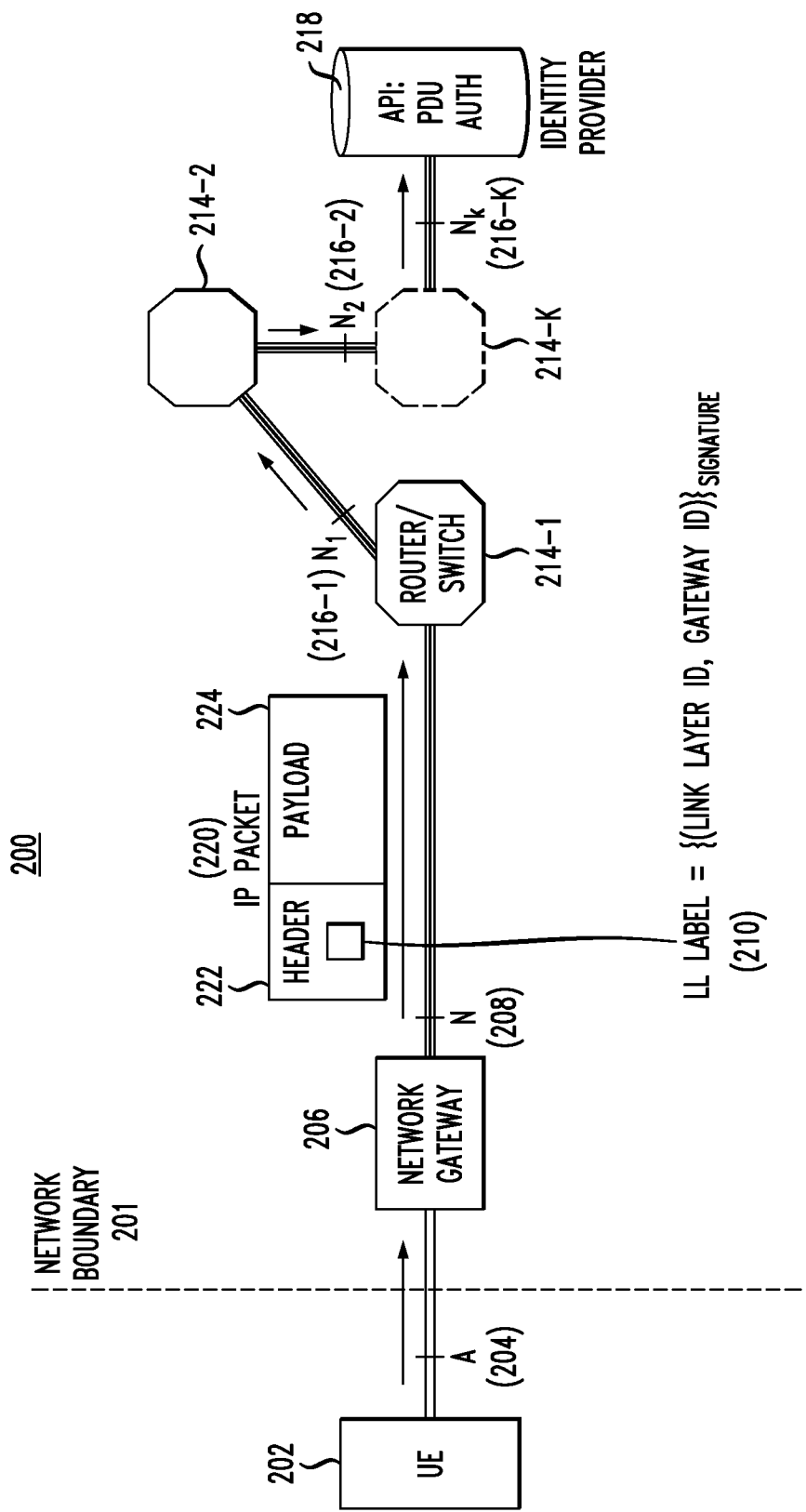
FIG. 2 is a diagram of a portion of a communication network within which packet painting can be performed, according to a second embodiment of the invention.

FIG. 2 is a diagram of a portion of a communication network 200 within which packet painting can be performed, according to a second embodiment of the invention. Note that the components and interfaces shown in FIG. 2 that are the same as the components and interfaces in FIG. 1 have similar reference numbers but are incremented by 100 (i.e., UE 102 in FIG. 1 corresponds to UE 202 in FIG. 2; gateway 106 in FIG. 1 corresponds to gateway 206 in FIG. 2, and so on).

A main difference between the embodiment of FIG. 1 and the embodiment of FIG. 2 is in where the LL Label is carried. In the embodiment of FIG. 2, the LL label 210 is included in an existing or new IP header field 222 of the packet 220 being routed (the packet contains a payload 224). Recall that the embodiment of FIG. 1 appends the label to each packet.

Specifically, as shown in FIG. 2, for every packet 220 from an authenticated UE 202 that arrives at the network gateway server 206, the gateway generates the LL label 210 and puts it in the appropriate IP header field 222 before forwarding the packet to the next router or switch 214-1. The label 210 stays unchanged as the packet 220 traverses a series of routers or switches (214-1, 214-2 . . . 214-$k$) before reaching the identity provider (application server) 218. That is, the routers or switches along the way simply do not touch the label header field. It is possible that the packet from the UE 202 already carries an LL label. In this case, the gateway 206 overwrites the existing label with the LL label 210 that it generates.

Figure 3:
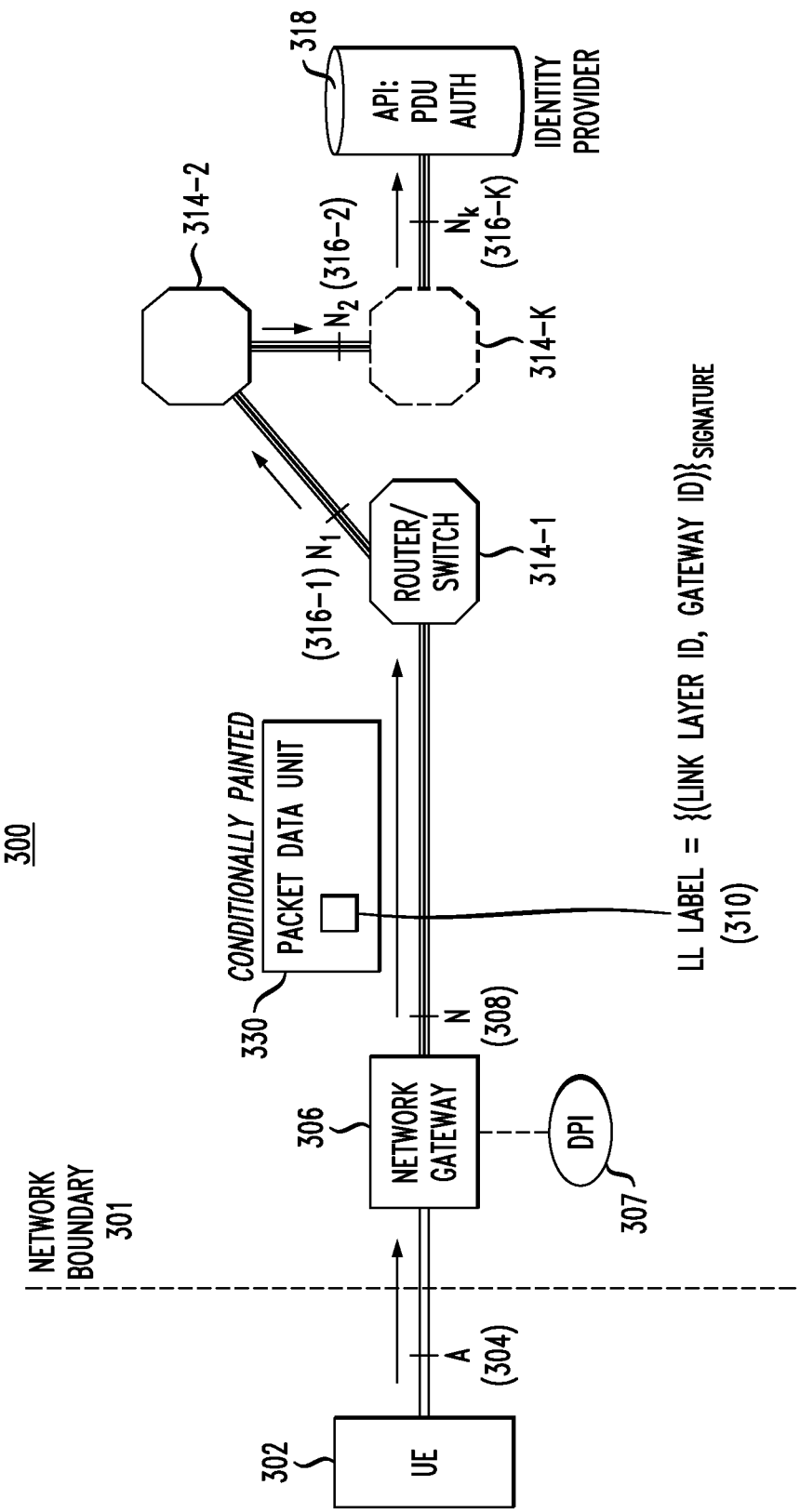
FIG. 3 is a diagram of a portion of a communication network within which packet painting can be performed, according to a third embodiment of the invention.

FIG. 3 is a diagram of a portion of a communication network 300 within which packet painting can be performed, according to a third embodiment of the invention. FIG. 3 demonstrates an illustrative embodiment pertinent to the deep packet inspection (DPI) concept. Again note that the components and interfaces shown in FIG. 3 that are the same as the components and interfaces in FIG. 1 have similar reference numbers but are incremented by 200 (i.e., UE 102 in FIG. 1 corresponds to UE 302 in FIG. 3; gateway 106 in FIG. 1 corresponds to gateway 306 in FIG. 3, and so on).

In the embodiment of FIG. 3, the network gateway server 302 performs deep packet inspection (DPI) 307. In one embodiment, the deep packet inspection may preferably include one or more of the techniques described in the emerging ITU-T standards document referred to as ITU-T New Draft Recommendation: "Requirements for DPI in packet-based networks and NGN," draft 2010, ITU-T, Geneva. Switzerland, the disclosure of which is incorporated by reference herein in its entirety. However, it is to be understood that principles of the invention are not intended to be limited to the ITU-T deep packet inspection analysis but rather can include other techniques for determining the presence of triggers and/or conditions, as described herein.

Thus, when the network gateway server 302 detects a certain condition (e.g., detection of the OpenID authentication request or an IdP destination) via the DPI analysis 307, this condition presence (or occurrence or existence) triggers the gateway to add the LLID information (label 310) to the appropriate IP header field of the packet 330. Packet 330 is considered a "conditionally painted" packet since it is only marked or labeled if the specified condition is present. Then, as in the above embodiments, the identity provider (application server) 318 checks the signature, determines whether the PDU 330 has been authenticated, and then associates the LLID 310 with the application ID.

Figure 4:
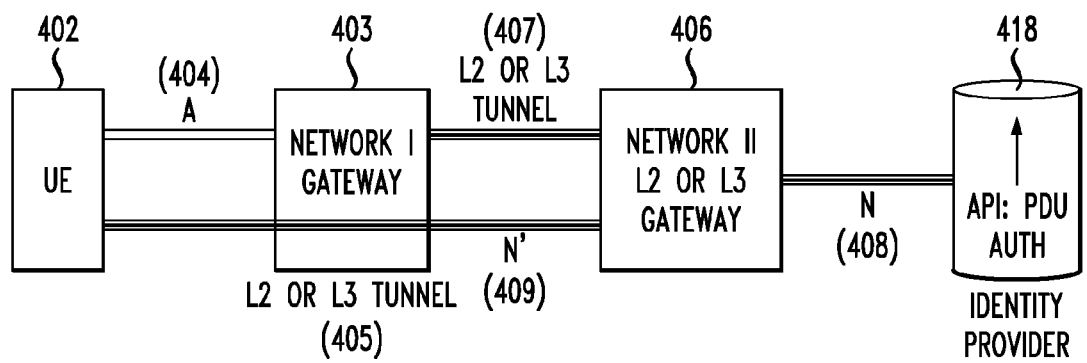
FIG. 4 is a diagram of a portion of a communication network within which packet painting can be performed, according to a fourth embodiment of the invention.

FIG. 4 is a diagram of a portion of a communication network 400 within which packet painting can be performed, according to a fourth embodiment of the invention. FIG. 4 demonstrates an illustrative embodiment which covers the case of UE roaming, i.e., UE moving from a home network to a visiting network. Again, where appropriate, the components and interfaces shown in FIG. 4 that are the same as the components and interfaces in FIG. 1 have similar reference numbers but are incremented by 300 (i.e., UE 102 in FIG. 1 corresponds to UE 402 in FIG. 4; gateway 106 in FIG. 1 corresponds to gateway 406 in FIG. 4, and so on).

In this case, UE 402 is connected to the visiting network gateway server 403 (network I gateway). The connection to the home network (network II) is achieved through either a layer-2 or layer-3 tunnel 407 between network I gateway 403 and network II gateway 406. This connection is supported by interface (N') 409. In either case, however, the terminating gateway server 406 (network II gateway) is expected to paint (mark or label) the packets. With that, if it is a layer-3 gateway, as an alternative to the painting methods described above, the gateway 406 can actually sign the payload of the packets. Note that the UE 402 can be connected directly to the home network 406, via network gateway server 406, over a layer-2 or layer-3 tunnel 405 when it is not roaming.

Figure 5:
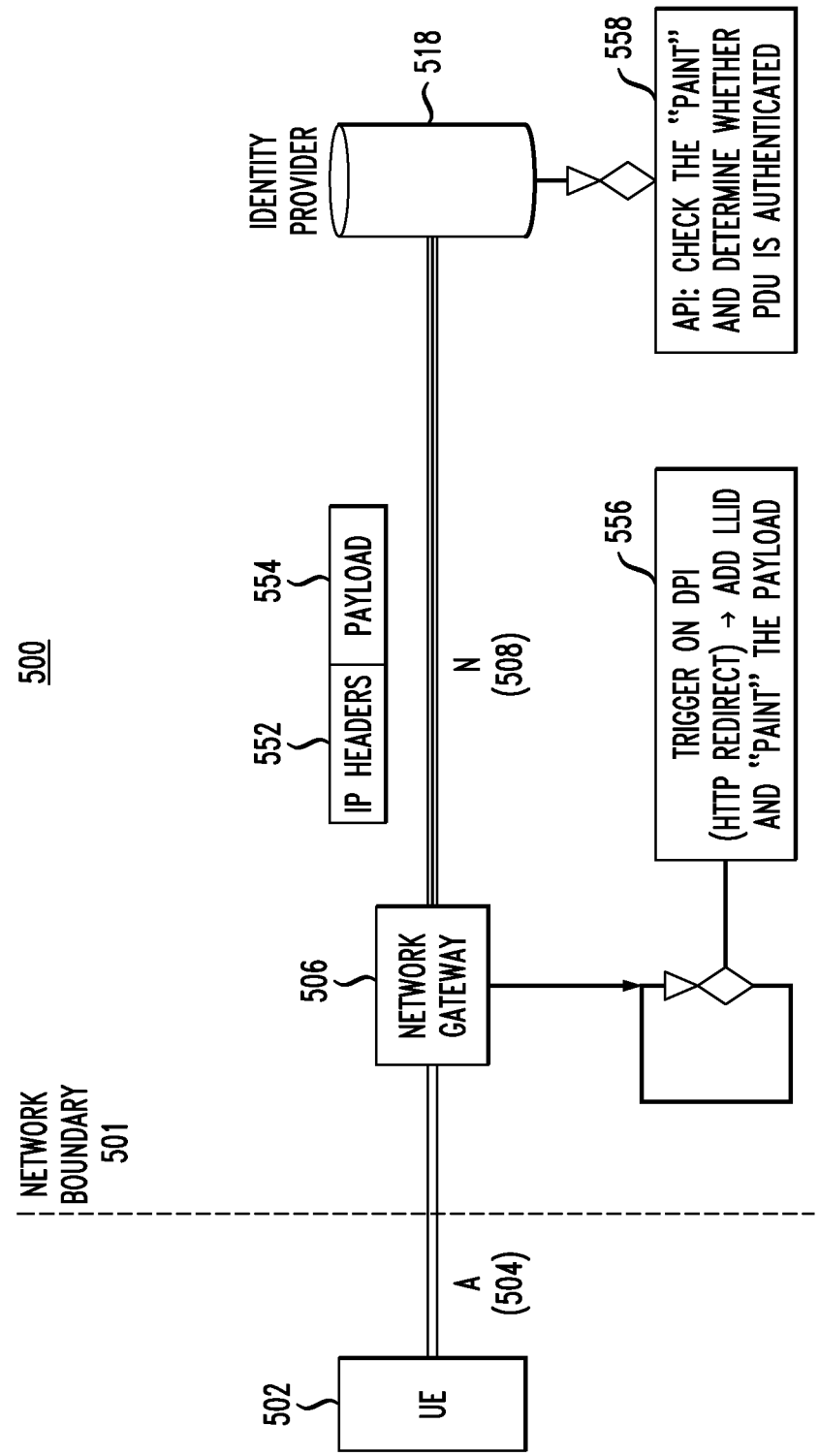
FIG. 5 is a diagram of a portion of a communication network within which packet painting can be performed, according to a fifth embodiment of the invention.

FIG. 5 is a diagram of a portion of a communication network 500 within which packet painting can be performed, according to a fifth embodiment of the invention. This embodiment is similar to the embodiment of FIG. 2 except that the embodiment of FIG. 5 employs a DPI trigger as described above in the context of FIG. 3. That is, in FIG. 5, the network gateway, rather than painting all packets, can choose to paint specific ones as triggered by a defined policy. Again, where appropriate, the components and interfaces shown in FIG. 5 that are the same as the components and interfaces in FIG. 1 have similar reference numbers but are incremented by 400 (i.e., UE 102 in FIG. 1 corresponds to UE 502 in FIG. 5; gateway 106 in FIG. 1 corresponds to gateway 506 in FIG. 5, and so on).

The embodiment of FIG. 5 is for the cases where it is possible to perform DPI and modify the packets (headers 552 and payload 554) at the gateway 506 (which means that neither encryption nor integrity protection is employed at a higher layer), and where the network policy allows for such packet painting. In this case, the action can be, for example, triggered by the presence of a specific application header (such as an HTTP Redirect), and it will result in the "paint" (LL label) added to the payload in a network-defined manner, as illustrated in flowchart 556.

It is to be appreciated that, up to this point, various painting techniques have been demonstrated which authenticate the user to an identity provider (application server). However, it has not yet been demonstrated how the network is authenticated to the user. Before doing so below in the context of FIG. 6, we note that even without mutual authentication, the network can already act in a role of an identity provider to others.

Figure 6:
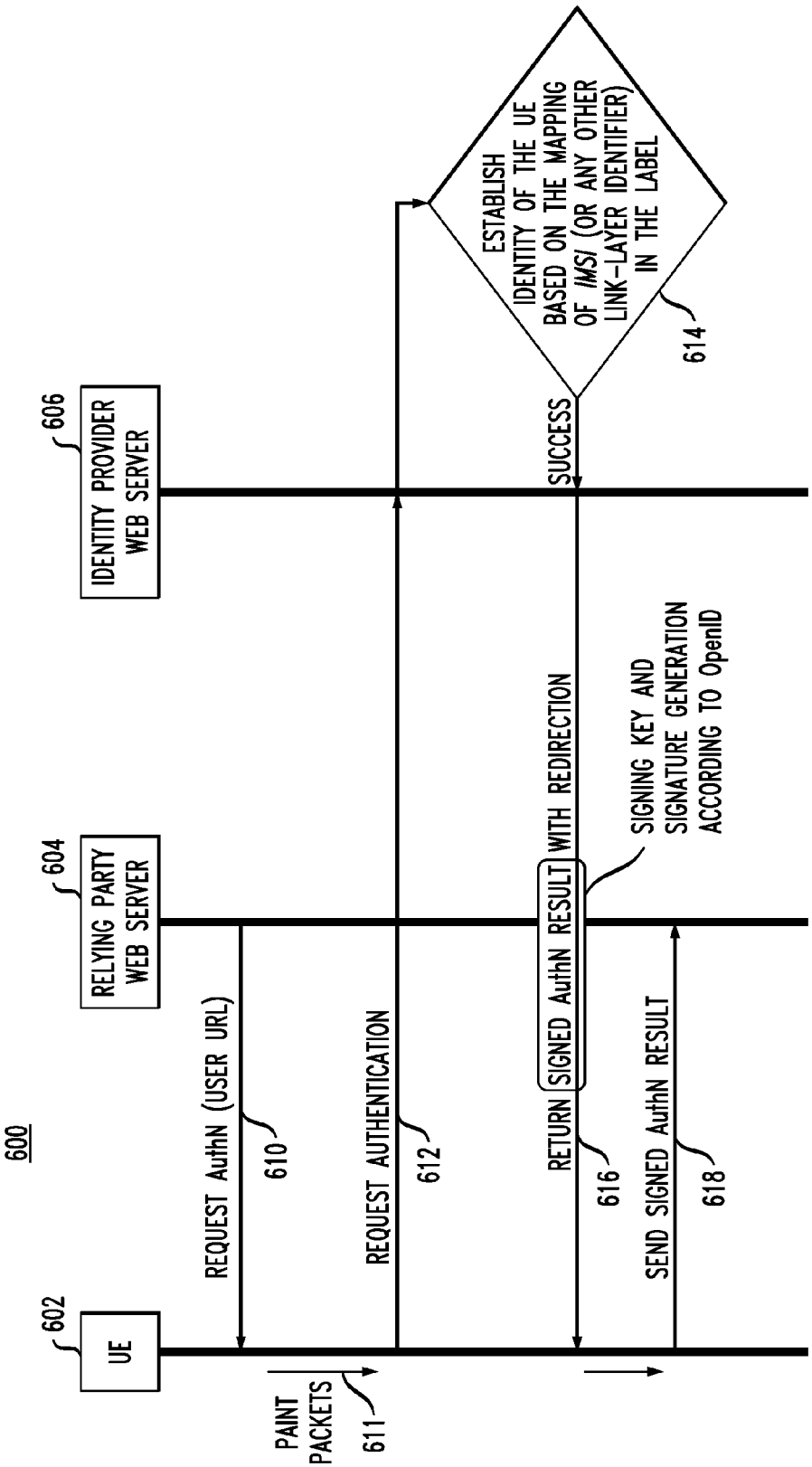
FIG. 6 is a diagram of a portion of a communication network within which packet painting can be performed, according to a sixth embodiment of the invention.

FIG. 6 is a diagram of a portion of a communication network 600 within which mutual authentication can be performed, according to a sixth embodiment of the invention. In particular, FIG. 6 is an embodiment that demonstrates the information and decision flows for a mutual authentication service.

As shown, a relying party 604, which is a Web server that supports OpenID, discovers the network provider's identity provider 606 and redirects to it the UE 602 for authentication (step 610). UE 602 sends request for authentication (step 612) to identity provider (IdP) 606. The IdP 606 checks (step 614) the "paint" (label) associated to (packets of) the request and determines whether the identity of the label maps to that of the OpenID for that UE. If so, the IdP 606 confirms the authentication by returning the signed AuthN result (step 616), as requested by the OpenID protocol. Thus, the UE and IdP have completed a mutual authentication. The UE 602 then sends (step 618) the signed AuthN result to the relying party 604.

It is to be understood that the packets are painted (labeled) as part of step 611 and sent to IdP 606 as part of the authentication request of step 612. This allows IdP 606 to determine their authenticity. It is also to be understood that both IdP 606 and relying party 604 are considered application servers.

While this particular embodiment utilizes aspects of the OpenID standard and specification (cited above), it is to be understood that OpenID is one example of an open source identification standard and an open source-based identifier that may be used. Thus, other suitable identification standards that provide similar facilities and features as OpenID may be considered as being within the scope of embodiments of the invention.

Recall also that the label (e.g., 110 in FIG. 1) preferably displays the gateway ID. Thus, an application server within the network can create a new pair of symmetric keys (one for encryption, and one for integrity protection) and share these keys, via the gateway, with the UE. As such, a 3GPP bootstrapping function (BSF), as well as the IMS serving call session control function (S-CSCF) (or proxy call session control function (P-CSCF)) can, themselves, use packet painting for authentication.

Figure 7:
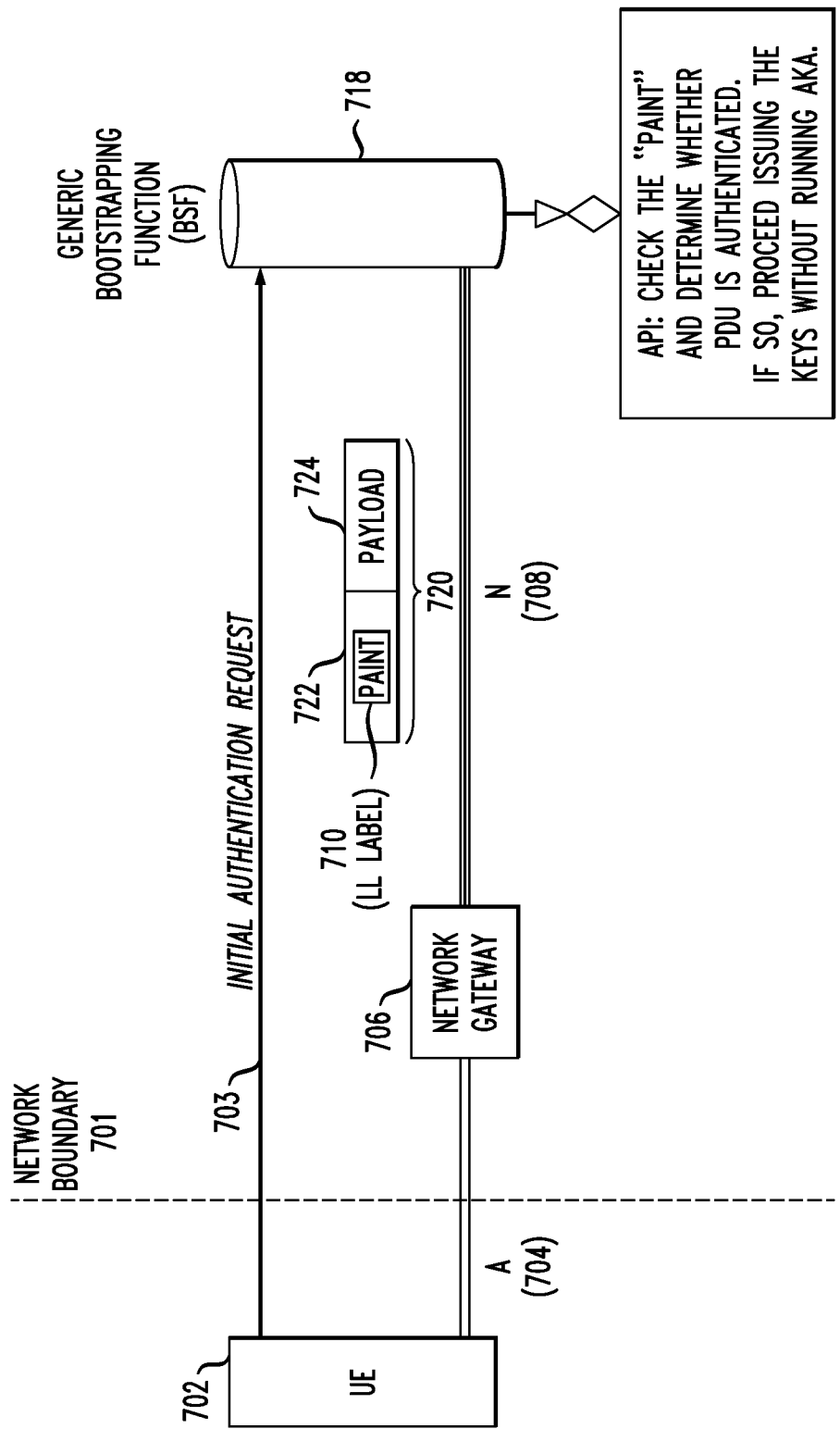
FIG. 7 is a diagram of a portion of a communication network within which packet painting can be performed, according to a seventh embodiment of the invention.

FIG. 7 demonstrates the case of the BSF. Again, where appropriate, the components and interfaces shown in FIG. 7 that are the same as the components and interfaces in FIG. 1 have similar reference numbers but are incremented by 600 (i.e., UE 102 in FIG. 1 corresponds to UE 702 in FIG. 7; gateway 106 in FIG. 1 corresponds to gateway 706 in FIG. 7, and so on). In this case, it is to be understood that the BSF 718 acts as an application server.

As shown in FIG. 7, when UE 702 sends the first request for authentication 703, BSF 718 checks the paint (e.g., label 710 in the header 722 of packet 720 which also has a payload 724) received from network gateway 706, and determines whether the request has arrived from a valid user without the need for performing an AKA procedure.

Figure 8:
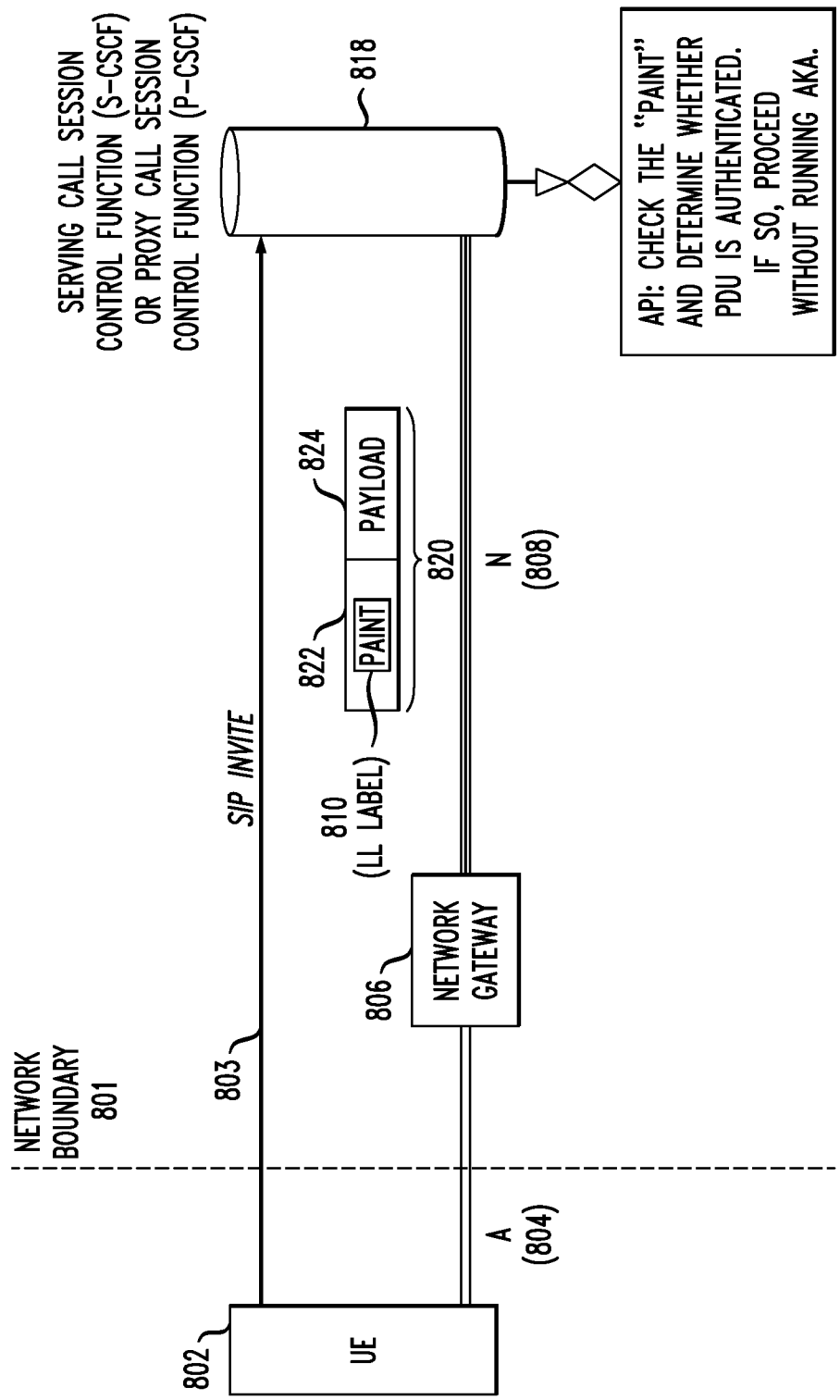
FIG. 8 is a diagram of a portion of a communication network within which packet painting can be performed, according to an eighth embodiment of the invention.

FIG. 8 demonstrates the case of the S-CSCF (P-CSCF). Components and interfaces shown in FIG. 8 that are the same as the components and interfaces in FIG. 7 have similar reference numbers but are incremented by 100. In this case, it is to be understood that the S-CSCF (P-CSCF) 818 acts as an application server.

When the UE 802 issues UE SIP INVITE 803, the IMS S-CSCF (or P-CSCF) 818 checks the paint (e.g., label 810 in the header 822 of packet 820 which also has a payload 824) received from network gateway 806, and determines whether the request has arrived from a valid user without the need for performing an AKA procedure.

It is to be appreciated that one of ordinary skill in the art will understand details relating to the typical operations of a BSF and an S-CSCF (P-CSCF). However, further details may be found in 3GPP GBA: 3GPP TS 33.220 V9.2.0 (2009-12), 3rd Generation Partnership Project; Technical Specification Group Services and System Aspects; Generic Authentication Architecture (GAA); Generic bootstrapping architecture (Release 9); and "The 3G IP Multimedia Subsystem (IMS): Merging the Internet and the Cellular Worlds" Gonzalo Camarillo, Miguel-Angel Garcia-Martin (John Wiley & Sons, 2006); the discourses of which are incorporated by reference herein in their entireties.

Figure 9:
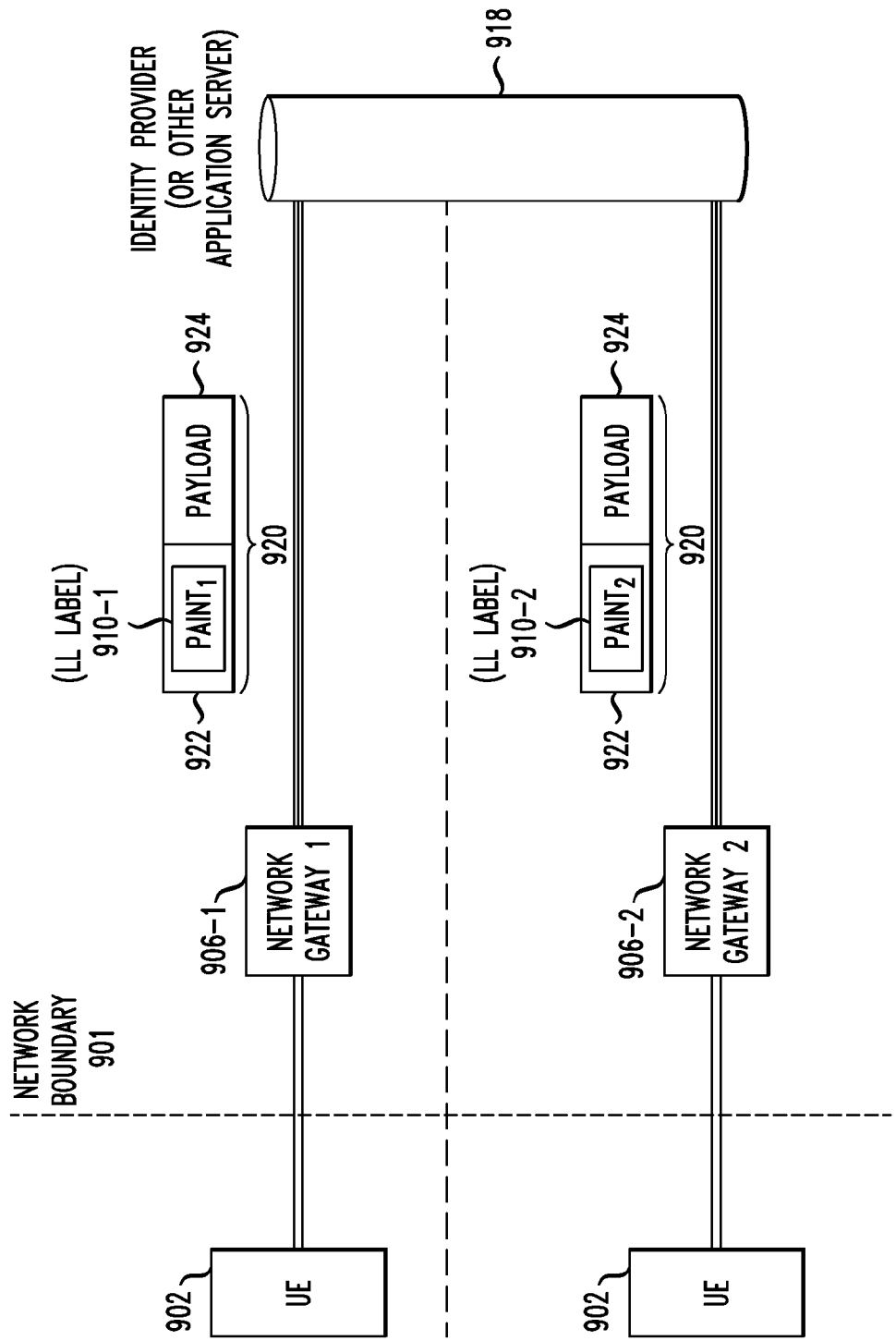
FIG. 9 is a diagram of a portion of a communication network within which packet painting can be performed, according to a ninth embodiment of the invention.

Illustrative principles of the invention also support mobility dynamically as the gateway ID changes dynamically as the UE becomes attached to it. FIG. 9 demonstrates the change. Again, similar components and interfaces in FIG. 9 have their reference numerals incremented by 800 as compared to FIG. 1.

As shown, when the UE 902 moves from one gateway 906-1 (network gateway 1) to gateway 906-2 (network gateway 2), the paint changes to reflect this. For example, as shown, the packet 920 (with header 922 and payload 924) is painted with label 910-1 by network gateway 906-1 and with label 910-2 by network gateway 906-2. IdP 918 (or other application server) receives the painted packets from whichever network gateway to which the UE is connected.

It is to be appreciated that the packet painting techniques of the invention may be employed with the identity management techniques described in the U.S. patent application identified as Ser. No. 12/437,248, filed on May 7, 2009, entitled "Identity Management Services Provided By Network Operator," the disclosure of which is incorporated by reference herein in its entirety.

FIG. 10 is a diagram of a hardware architecture of a communication network 1000 suitable for implementing packet painting, according to an embodiment of the invention. As shown, end user device 1010 (e.g., user equipment 102), gateway server 1020 (e.g., network gateway server 106), and application server 1030 (e.g., IdP 118, BSF 818, S-CSCF/P-CSCF 918), are operatively coupled via communication network medium 1050. The network medium may be any network medium across which the user equipment and the servers desire to communicate. By way of example, the network medium can carry IP packets end to end and may involve UMTS or WiFi or DSL (Digital Subscriber Line) in the access network, Ethernet in the metro network, and MPLS (Multiprotocol Label Switching) in the backbone. However, the invention is not limited to a particular type of network medium. Typically, end user device 1010 could be a client machine and servers 1020 and 1030 could be server machines.

As would be readily apparent to one of ordinary skill in the art, the servers and clients may be implemented as programmed computers operating under control of computer program code. The computer program code would be stored in a computer (or processor or machine) readable storage medium (e.g., a memory) and the code would be executed by a processor of the computer. Given this disclosure of the invention, one skilled in the art could readily produce appropriate computer program code in order to implement the protocols described herein.

Nonetheless, FIG. 10 generally illustrates an exemplary architecture for each device communicating over the network medium. As shown, end user device 1010 comprises I/O devices 1012, processor 1014, and memory 1016. Gateway server 1020 comprises I/O devices 1022, processor 1024, and memory 1026. Application server 1030 comprises I/O devices 1032, processor 1034, and memory 1036.

It should be understood that the term "processor" as used herein is intended to include one or more processing devices, including a central processing unit (CPU) or other processing circuitry, including but not limited to one or more signal processors, one or more integrated circuits, and the like. Also, the term "memory" as used herein is intended to include memory associated with a processor or CPU, such as RAM, ROM, a fixed memory device (e.g., hard drive), or a removable memory device (e.g., diskette or CDROM). In addition, the term "I/O devices" as used herein is intended to include one or more input devices (e.g., keyboard, mouse) for inputting data to the processing unit, as well as one or more output devices (e.g., CRT display) for providing results associated with the processing unit.

Accordingly, software instructions or code for performing the methodologies of the invention, described herein, may be stored in one or more of the associated memory devices, e.g., ROM, fixed or removable memory, and, when ready to be utilized, loaded into RAM and executed by the CPU. That is, each computing device (1010, 1020, and 1030) shown in FIG. 10 may be individually programmed to perform their respective steps of the protocols depicted in FIGS. 1 through 9.

Although illustrative embodiments of the present invention have been described herein with reference to the accompanying drawings, it is to be understood that the invention is not limited to those precise embodiments, and that various other changes and modifications may be made by one skilled in the art without departing from the scope or spirit of the invention.

What is claimed is:

1. A method, comprising:
in a communication network wherein a first computing device is an end user device, a second computing device is a gateway server, and a third computing device is an application server;
the second computing device authenticating one or more packets received from the first computing device; and
the second computing device marking the one or more packets with a first-layer identity before routing the one or more packets toward the third computing device such that the third computing device is able to authenticate the one or more packets from the first computing device by confirming an association between the first-layer identity and a second-layer identity;
wherein the first-layer identity comprises an identity associated with a first layer and the second-layer identity comprises an identity associated with a second layer, the first layer being different from the second layer;
wherein the first-layer identity comprises a link layer identity assigned to the first computing device;
wherein the second-layer identity comprises an application layer identity assigned to the first computing device; and
wherein the second computing device further marks the one or more packets with a gateway identity of the second computing device such that the one or more packets are marked with a label that comprises the first-layer identity of the end user device and said gateway identity.

2. The method of claim 1, wherein the marking of the one or more packets comprises appending the first-layer identity to each of the one or more packets.

3. The method of claim 1, wherein the marking of the one or more packets comprises inserting the first-layer identity into each of the one or more packets.

4. The method of claim 1, wherein the marking of the one or more packets with the first-layer identity is responsive to a deep packet inspection.

5. The method of claim 1, wherein the marking of the one or more packets with the first-layer identity is responsive to a presence of at least one condition.

6. The method of claim 5, wherein the at least one condition is an OpenID-based identifier request.

7. The method of claim 5, wherein the at least one condition is an identity provider destination.

8. The method of claim 1, wherein the communication network is a visiting communication network with respect to the end user device.

9. The method of claim 8, wherein the gateway server is a gateway server in the visiting network at which the one or more packets terminate in accordance with a tunneling protocol.

10. The method of claim 1, wherein the application server is an identity provider server.

11. The method of claim 1, wherein the application server is a bootstrapping function server.

12. The method of claim 1, wherein the application server is a call session control function server.

13. An article of manufacture comprising a non-transitory processor-readable storage medium storing one or more software programs which when executed by a processor associated with the second computing device perform the steps of the method of claim 1.

14. A method, comprising:
in a communication network wherein a first computing device is an end user device, a second computing device is a gateway server, and a third computing device is an application server;
the third computing device receiving one or more packets from the second computing device, the second computing device having authenticated the one or more packets received from the first computing device and having marked the one or more packets with a first-layer identity before routing the one or more packets toward the third computing device; and
the third computing device authenticating the one or more packets from the first computing device by confirming an association between the first-layer identity and a second-layer identity;
wherein the first-layer identity comprises an identity associated with a first layer and the second-layer identity comprises an identity associated with a second layer, the first layer being different from the second layer;
wherein the first-layer identity comprises a link layer identity assigned to the first computing device;
wherein the second-layer identity comprises an application layer identity assigned to the first computing device; and
wherein the one or more packets are further marked with a gateway identity of the second computing device, such that the one or more packets are marked with a label that comprises the first-layer identity of the end user device and said gateway identity.

15. An article of manufacture comprising a non-transitory processor-readable storage medium storing one or more software programs which when executed by a processor associated with the third computing device perforin the steps of the method of claim 14.

16. An apparatus, comprising:
in a communication network wherein a first computing device is an end user device and a second computing device is an application server, a third computing device serving as a gateway server and comprising:
a memory; and
a processor coupled to the memory and operative to:
authenticate one or more packets received from the first computing device; and
mark the one or more packets with a first-layer identity before routing the one or more packets toward the second computing device such that the second computing device is able to authenticate the one or more packets from the first computing device by confirming an association between the first-layer identity and a second-layer identity;
wherein the first-layer identity comprises an identity associated with a first layer and the second-layer identity comprises an identity associated with a second layer, the first layer being different from the second layer;
wherein the first-layer identity comprises a link layer identity assigned to the first computing device;
wherein the second-layer identity comprises an application layer identity assigned to the first computing device; and
wherein the processor of the third computing device is further operative to mark the one or more packets with a gateway identity of the third computing device such that the one or more packets are marked with a label that comprises the first-layer identity of the end user device and said gateway identity.

17. An apparatus, comprising:
in a communication network wherein a first computing device is an end user device and a second computing device is a gateway server, a third computing device serving as an application server and comprising:
a memory; and
a processor coupled to the memory and operative to:
receive one or more packets from the second computing device, the second computing device having authenticated the one or more packets received from the first computing device and having marked the one or more packets with a first-layer identity before routing the one or more packets toward the third computing device; and
authenticate the one or more packets from the first computing device by confirming an association between the first-layer identity and a second-layer identity;
wherein the first-layer identity comprises an identity associated with a first layer and the second-layer identity comprises an identity associated with a second layer, the first layer being different from the second layer;
wherein the first-layer identity comprises a link layer identity assigned to the first computing device;
wherein the second-layer identity comprises an application layer identity assigned to the first computing device; and
wherein the one or more packets are further marked with a gateway identity of the second computing device, such that the one or more packets are marked with a label that comprises the first-layer identity of the end user device and said gateway identity.

* * * * *